Figure 1:
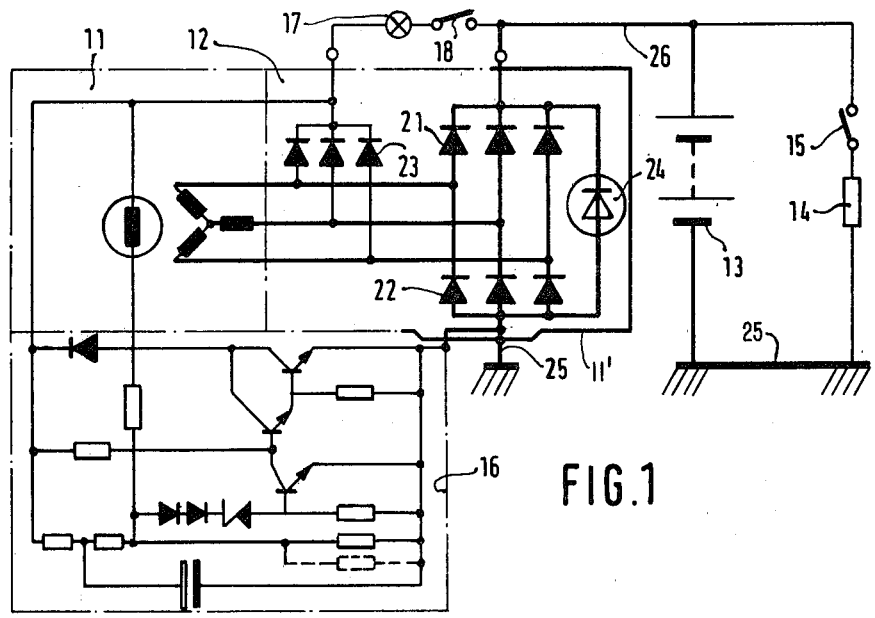

United States Patent

Meyer et al.

[11] 4,390,792
[45] Jun. 28, 1983

[54] AUTOMOTIVE ELECTRICAL POWER SUPPLY SYSTEM WITH REVERSE POLARITY INDICATION

[75] Inventors: Friedhelm Meyer, Illingen; Wolfgang Kurz, Hemmingen; Joachim Severing, Ludwigsburg, all of Fed. Rep. of Germany

[73] Assignee: Robert Bosch GmbH, Stuttgart, Fed. Rep. of Germany

[21] Appl. No.: 281,238

[22] Filed: Jul. 7, 1981

[30] Foreign Application Priority Data

Aug. 14, 1980 [DE] Fed. Rep. of Germany ...... 3030700

[51] Int. Cl.³ .............................................. H02J 7/00
[52] U.S. Cl. ................................. 307/10 BP; 320/25
[58] Field of Search ................ 307/10 BP; 320/25; 290/50

[56] References Cited

U.S. PATENT DOCUMENTS

| | | | |
|---|---|---|---|
| 3,051,887 | 8/1962 | Lind | 320/25 |
| 3,241,031 | 3/1966 | Raver | 320/25 UX |
| 3,456,181 | 7/1969 | Godshalk | 320/25 |
| 3,648,146 | 3/1972 | Rollen et al. | 307/10 BP X |
| 3,659,183 | 4/1972 | Carlson | 320/25 |
| 4,145,648 | 3/1979 | Zender | 320/25 |

*Primary Examiner*—Donald A. Griffin
*Attorney, Agent, or Firm*—Frishauf, Holtz, Goodman & Woodward

[57] ABSTRACT

To provide a positive indication that a battery has been reversely connected to a self-contained electrical network, for example a vehicular or boat network, a diode (24) of low current carrying capacity is connected across the terminals (25, 26) of the network, poled in blocking direction. Upon erroneous or reverse connection of the battery (13) with reverse terminals, the diode will immediately burn out, thus providing positive identification of such a reverse connection, even if only of such short time duration that the main rectifier diodes were not yet damaged. To prevent spurious replacement of the diode and thus elimination of the indication, the diode (24) can be molded into or cemented into a depression or groove formed in the insulating support plate (28) supporting the rectifier element.

7 Claims, 3 Drawing Figures

AUTOMOTIVE ELECTRICAL POWER SUPPLY SYSTEM WITH REVERSE POLARITY INDICATION

The present invention relates to on-board, self-contained vehicular power supply systems, and more particularly to such systems which provide for indication if a battery, with which such systems are customarily used, is reversely connected.

BACKGROUND

On-board vehicular systems are usually used in automotive vehicles, boats, or other installations where a self-contained electrical power network is desirable. Such systems utilize a battery when the prime mover, typically an automotive-type internal combustion engine, or the like, is not operating or only operating slowly, for example at idle speed; and to provide starting power. The battery, at times, is disconnected, for example for maintenance, replacement, or the like. In case of carelessness, it is possible that the battery, upon re-attachment, is reversely polarized. Reverse polarization, even if for only a very short period of time, causes severe damage to the semiconductor rectifiers with which alternators, providing power to the battery, are customarily connected. Reverse polarization can occur, for example, by reverse positioning of the battery in the battery well, interchange of connectors, use of a replacement battery with differently positioned terminals or the like. If the battery is connected with reverse polarization, the diodes, at least of the rectifier, are usually damaged to the resulting high current which will flow. It has occurred that users of such battery charge systems, as well as careless installers, will not admit that the battery was reversely connected and insist with respect to the manufacturer of the rectifier that the rectifier diodes were originally defective. In such cases, and to prevent false warranty claims, it is important to be able to prove to the user that the battery was reversely connected.

It has been tried to fit into the rectifier system weak points, fuses, or the like, using thin contact wires, connections which are weakened, or of restricted diameter in the bridge circuits of the rectifiers, and burn-through fuses. All such elements have been found unsatisfactory since they can respond even upon normal use of the rectifier. Particularly in automotive vehicles, the stress placed on such "weak links" is considerable, for example due to vibration, corrosion, and the like, causing interruption of the rectifier circuit, and failure of the power supply. Additionally, it has been found that fuses have to be dimensioned to be able to carry high currents in order to carry the normally high currents which may arise upon substantial charging. Such high-current fuses would not respond quickly enough upon reverse polarization to prevent damage to the rectifier. Fuses and weak links if designed to carry high charging currents, such as fusible links, are not sufficiently reliable to permit response to the high reversely polarized currents, although only practically instantaneous by occurring.

THE INVENTION

It is an object to provide a battery charging system using an alternator connected to a rectifier which contains an element which clearly shows if a battery has been connected with reverse polarization.

Briefly, a diode is provided, connected across the output terminals of the rectifier, and poled in blocking direction with respect to the normal or rated polarity of the output terminals. The diode, preferably, has a current capacity which is small with respect to that of the rectifier. If a battery is correctly connected, the quiescent current of the diode will be negligible, so that continuous discharge of the battery therethrough is effectively prevented. Upon connection of the battery with reverse polarization, however, the diode will be connected directly across the battery terminals in conductive direction, causing practically instantaneous destruction thereof. Destruction of the diode is positive proof that a battery has been connected across the terminals of the system with reverse polarity.

The system has the advantage that the normal operation of the generator and the charging system is not interfered with in any way, and no current-limiting elements are included in the circuit. The diode, under normal operation, carries, for practical purposes, no current. Current flows through the diode only if a battery is connected to the system with reverse polarity which causes electrical destruction thereof, and even if the power diodes of the rectifiers have not yet been damaged. Reverse connection of a battery thus can be reliably proven.

The diode can be located at any desired position in the battery charging system, preferably so that it is visible or can be readily identified; in a preferred form, the diode is located physically on the rectifier array coupled to the output of the alternator, positioned within the generator; alternatively, the diode may be located at any other convenient position within the current supply network. It need only be connected between the positive and negative supply buses of the electrical network.

In accordance with a particularly desirable feature of the invention, the diode is fitted in the insulating element which normally is provided to separate the respective arrays of the rectifier with respect to each other. The diode can be fitted in a groove or depression and retained therein by an adhesive or cement; alternatively, it can be injection-molded into the insulating element. This is particularly desirable if the manufacturer has been subjected to false warranty claims since later replacement of the diode is not possible without interfering with the rectifier array as such, tampering with the diode being clearly indicated. In dependence on the particular construction of the battery system, a plurality of such diodes may be used within the on-board vehicular network.

DRAWINGS

Figure 2:
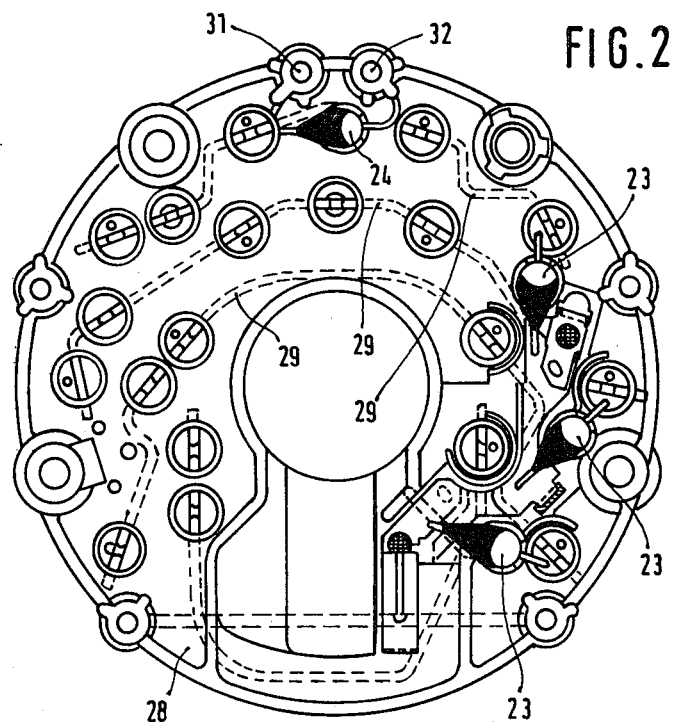
Figure 3:
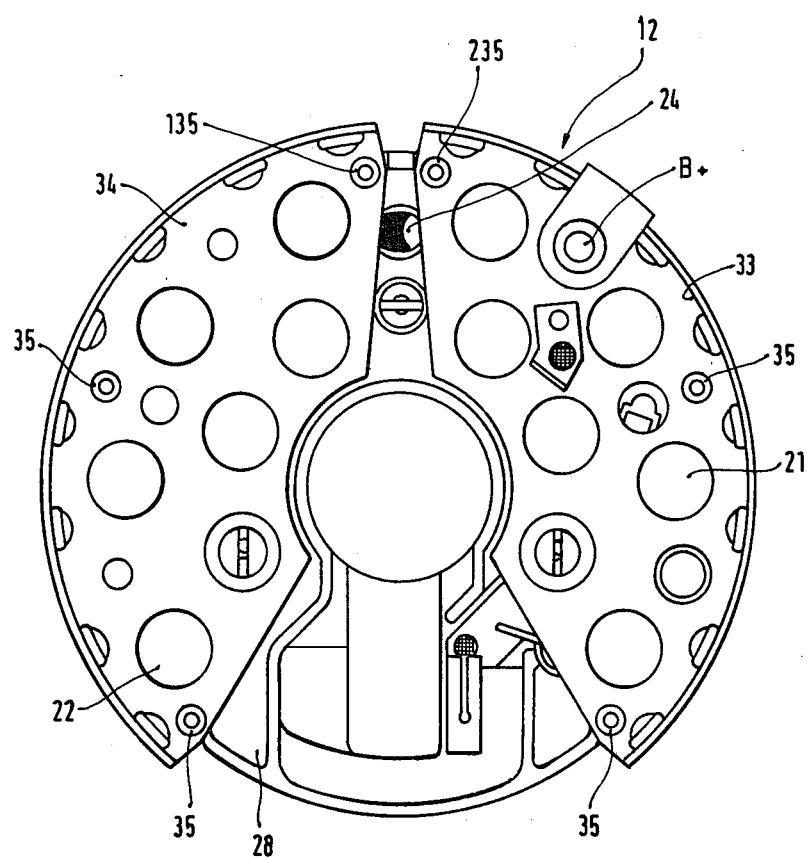

FIG. 1 is a highly schematic diagram of an automotive on-board vehicular network; and FIGS. 2 and 3 are, respectively, end views of rectifier arrays illustrating two different embodiments and a desirable position for the indicator diode when connected to a bridge rectifier.

The basic electrical network illustrated in FIG. 1 is well known and standard and similar to that installed in many automotive vehicles. A three-phase alternator 11 has a three-phase bridge rectifier 12 connected thereto. The output of the three-phase rectifier 12 has a battery 13 connectable thereto. Loads 14, of which only one is shown, can be connected to the positive bus 26 of the battery and the negative terminal, which can be ground or chassis 25, through suitable switches, one of which is shown as switch 15. A voltage regulator 16 is connected to the generator 11 and also to the rectifier 12 to provide uniform output voltage of the alternator to charge the battery. FIG. 1 additionally shows the charge control lamp 17 and the vehicle operating switch 18.

The rectifier 12 has positive diodes 21, negative diodes 22, and field exciter diodes 23.

In accordance with the invention, an additional diode 24 is provided, connected between the positive and negative buses 26, 25, to provide an indication of reverse connection of a battery 13. The negative bus 25 of the system, in the example selected, is the chassis or ground connection; the positive bus 26 is derived from the output of the rectifier and connected to battery 13 and to form a positive supply line for the various loads 14.

Operation: In ordinary operation, that is, when the battery 13 is properly connected with its positive terminal to the positive bus 26 and with its negative terminal to the negative bus or chassis 25, no substantial current will flow from the positive terminal of the battery through the diode 24, which is poled in blocking direction with respect to the polarities shown. The only current which will flow is the quiescent or leakage current which, for current rectifiers, is so small that it can be neglected. If the battery is removed, and then reinstalled with reverse connection, or another battery is installed with reverse connection, so that the negative terminal of the new battery will be connected to the terminal 26, and the positive terminal to the negative bus or chassis 25, a heavy current will flow through the negative diodes 22 and the positive diodes 21, and in parallel thereto through the diode 24. This current is almost the value of the short current of the battery. Diode 24 is so dimensioned that, even upon short time or instantaneous polarity reversal of the battery, it is immediately electrically destroyed. Thus, even if the user of the battery charging system immediately notices the reverse connection—for example by a heavy spark—and immediately disconnects the reversely connected battery, diode 24, as an indication that a reverse connection had occurred, will remain destroyed. Only almost instantaneous reverse connection may not have completely destroyed or severely damaged the diodes 21, 22 to the extent that they become inoperative.

FIGS. 2 and 3 are end views of rectifiers customarily used in three-phase alternators for automotive installation. FIG. 2 shows an insulating plate 28 in which connecting lines 29 are molded. Insulating plate 28 has the exciter diodes 23 secured thereto. Diode 24, to indicate reverse polarity, is likewise shown. Diode 24 is positioned in a groove or hollowed portion, and the illustration of FIG. 2 shows the diode 24 before it is secured in position in its depression, for example by a cement or the like. It can be molded into the insulating plate 28. The two terminals of diode 24 are connected to solder eyes 31, 32 and soldered therein. FIG. 2 illustrates the rectifier in the assembly step before the power rectifiers 21, 22 on their respective cooling panels or sheets or fins have been secured to the insulating plate 28.

A complete rectifier is shown in FIG. 3. The rectifier 12 has a positive cooling plate 33, a negative cooling plate 34, each having the respective positive diodes 21 and negative diodes set therein. Diode 24, used only to indicate misconnection of the battery, can be seen between the cooling plates 33, 34. Diode 24 is illustrated in a position before being cemented into or molded into the base body 28. The cooling plates 33, 34 are connected to the insulating plate 28 by eyelet rivets 135. One of the eyelet rivets of the insulating body 28, that is, eyelet rivet 33, is electrically connected to a solder terminal disk 31 (not visible in FIG. 3—see FIG. 2). One of the rivets of the positive cooling plate 33, that is, rivet 235, is electrically connected with the rivet 32 (FIG. 2). This connection effects electrical placement of the diode 24 between the cooling plates and hence between the negative and positive buses 25, 26. The diode 24 is visible in the gap between the cooling plates so that its burn-out can be seen without entirely disassembling the diode array.

Various changes and modifications may be made within the scope of the inventive concept. For example, the diode can be connected to a portion of the housing—schematically shown by the heavy line 11' of the alternator and the positive terminal of the system, for example to a suitable location on the cooling plate 33 carrying the positive diodes. If desired, and primarily for cost reason, a plurality of serially connected diodes, each one having a voltage rating less than the rated voltage of the output, can be used, as well known.

We claim:

1. A self-contained power supply system having an alternator (11);
a battery (13) separable and separately connectable and replaceable in the system, and having terminals of predetermined polarity;
a rectifier (12) including an array of rectifier diodes (21, 22);
cooling plates (33, 34) retaining said rectifier diodes;
an insulating support plate (28), said cooling plates with the rectifier diodes thereon being secured to the insulating suppot plate; and
output terminals (25, 26) of said predetermined polarity, the rectifier being connected to the alternator to rectify the output therefrom and supply current to the battery to charge the battery, and
means to indicate connection of the battery (13) to the rectifier with reverse polarity including
a diode (24) connected across the output terminals (25, 26) and poled in blocking direction with respect to the polarity of the output terminals, said diode having a current capacity small with respect to that of the rectifier and being secured to the insulating plate (28) and electrically connected between the respective cooling plates (33, 34) of the rectifier.

2. System according to claim 1, wherein the small current capacity diode (24) is connected between the cooling plates (33, 34).

3. System according to claim 1, wherein said small current capacity diode (24) comprises a plurality of serially connected diode elements.

4. A self-contained power supply system having an alternator (11) including
an insulating plate (28)
a battery (13) separable and separately connectable and replaceable in the system, and having terminals of predetermined polarity;
a rectifier (12) secured to the insulating plate (28) and having output terminals (25, 26) of said predetermined polarity, the rectifier being connected to the alternator to rectify the output therefrom and supply current to the battery,
and comprising,
means to indicate connection of the battery (13) to the rectifier with reverse polarity including a diode (24) connected across the output terminals (25, 26) and poled in blocking direction with respect to the polarity of the output terminals, said diode having a current capacity small with respect to that of the rectifier;

and wherein the insulating plate is formed with a depression, and said small current capacity diode (24) is located in said depression.

5. System according to claim 4, wherein said small current capacity diode (24) comprises a plurality of serially connected diode elements.

6. A self-contained power supply system having an alternator (11) including an insulating support plate (28);

a battery (13) separable and separately connectable and replaceable in the system, and having terminals of predetermined polarity;

a rectifier (12) secured to the insulating plate (28) and having output terminals (25, 26) of said predetermined polarity, the rectifier being connected to the alternator to rectify the output therefrom and supply current to the battery to charge the battery, and comprising, means to indicate connection of the battery (13) to the rectifier with reverse polarity including a diode (24) connected across the output terminals (25, 26) and poled in blocking direction with respect to the polarity of the output terminals, said diode having a current capacity small with respect to that of the rectifier and being molded into said support plate (28).

7. System according to claim 6, wherein said small current capacity diode (24) comprises a plurality of serially connected diode elements.

* * * * *